United States Patent
Butzmann

(10) Patent No.: US 10,312,495 B2
(45) Date of Patent: Jun. 4, 2019

(54) BATTERY MODULE WITH ALARM LINE

(71) Applicants: Robert Bosch GmbH, Stuttgart (DE); Samsung SDI Co., Ltd., Yongin-si, Gyeonggi-do (KR)

(72) Inventor: Stefan Butzmann, Beilstein (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 1088 days.

(21) Appl. No.: 13/973,177

(22) Filed: Aug. 22, 2013

(65) Prior Publication Data

US 2014/0057143 A1    Feb. 27, 2014

(30) Foreign Application Priority Data

Aug. 23, 2012  (DE) .................. 10 2012 214 953

(51) Int. Cl.
*H01M 2/20* (2006.01)
*H01M 2/30* (2006.01)
*H01M 2/34* (2006.01)
*H01M 10/48* (2006.01)
*B60L 3/00* (2019.01)
*B60L 3/04* (2006.01)
*B60L 3/12* (2006.01)
*B60L 11/18* (2006.01)

(52) U.S. Cl.
CPC ............. *H01M 2/34* (2013.01); *B60L 3/0046* (2013.01); *B60L 3/0069* (2013.01); *B60L 3/04* (2013.01); *B60L 3/12* (2013.01); *B60L 11/1864* (2013.01); *H01M 2/202* (2013.01); *H01M 2/30* (2013.01); *H01M 10/482* (2013.01); *B60L 2240/545* (2013.01); *B60L 2240/547* (2013.01); *B60L 2240/549* (2013.01); *B60L 2250/10* (2013.01); *H01M 2220/20* (2013.01); *Y02T 10/7011* (2013.01); *Y02T 10/7061* (2013.01)

(58) Field of Classification Search
CPC .... H01M 2/34; H01M 2/202; H01M 2220/20; H01M 2/30
See application file for complete search history.

(56) References Cited

U.S. PATENT DOCUMENTS 3,874,743 A * 4/1975 Fleischer ................ B60T 8/885
  303/122.05
6,411,912 B1 * 6/2002 Sack .................... G01R 31/362
  320/134

(Continued)

*Primary Examiner* — Jonathan Crepeau
*Assistant Examiner* — Angela Martin
(74) *Attorney, Agent, or Firm* — Maginot, Moore & Beck LLP

(57) ABSTRACT

A battery module for a battery system includes two terminals, via which the battery module can be electrically connected to the battery system. Furthermore, the battery module has a battery string, which connects the two terminals to one another and has at least one battery cell connected in series and/or in parallel with the battery string. The battery module comprises a battery module circuit, which is configured, upon receiving an alarm signal, to bridge the battery module via the terminals thereof. The at least one battery cell is connected to a monitoring circuit associated with the battery cell. The monitoring circuit is connected to an alarm line via an electrical connection. The alarm line is connected to an input of the battery module circuit.

11 Claims, 2 Drawing Sheets

(56) References Cited

U.S. PATENT DOCUMENTS

| | | | | |
|---|---|---|---|---|
| 6,700,351 B2* | 3/2004 | Blair | H02J 7/0022 | 320/125 |
| 6,803,678 B2* | 10/2004 | Gottlieb | G01R 31/3648 | 307/66 |
| 7,068,012 B1* | 6/2006 | Geren | H01M 2/348 | 320/134 |
| 8,823,323 B2* | 9/2014 | Troxel | H02J 7/007 | 320/118 |
| 8,872,474 B2* | 10/2014 | Scheucher | B60K 1/04 | 320/107 |
| 9,041,341 B2* | 5/2015 | Fink | H01M 10/425 | 320/104 |
| 9,043,623 B2* | 5/2015 | Martin | G06F 13/4247 | 713/310 |
| 9,381,822 B2* | 7/2016 | Scheucher | B60L 8/00 | |
| 2001/0004322 A1* | 6/2001 | Kurokami | H02M 7/53873 | 363/56.03 |
| 2001/0033502 A1* | 10/2001 | Blair | H02J 7/0022 | 363/65 |
| 2005/0036248 A1* | 2/2005 | Klikic | H02J 9/062 | 361/42 |
| 2005/0134444 A1* | 6/2005 | Park | B60C 23/0411 | 340/445 |
| 2007/0190369 A1* | 8/2007 | Leach | H02J 7/0018 | 429/9 |
| 2007/0257640 A1* | 11/2007 | McClure | H02J 7/0031 | 320/132 |
| 2008/0238370 A1* | 10/2008 | Carrier | H01M 2/1022 | 320/134 |
| 2009/0009136 A1* | 1/2009 | Heinrich | H01M 10/425 | 320/134 |
| 2009/0315491 A1* | 12/2009 | Karwath | H02P 6/008 | 318/379 |
| 2010/0270973 A1* | 10/2010 | Miyazaki | H01M 10/441 | 320/120 |
| 2012/0058379 A1* | 3/2012 | Kishi | H01M 4/485 | 429/149 |
| 2012/0148877 A1* | 6/2012 | Kalman | H01M 2/105 | 429/7 |
| 2013/0113495 A1* | 5/2013 | Kim | G01R 31/3606 | 324/434 |
| 2013/0164567 A1* | 6/2013 | Olsson | H01M 10/488 | 429/7 |
| 2013/0176652 A1* | 7/2013 | Kim | H02H 3/20 | 361/86 |
| 2014/0070772 A1* | 3/2014 | Andres | H01M 2/347 | 320/136 |
| 2017/0110890 A1* | 4/2017 | Ludtke | H02J 7/0004 | |

* cited by examiner

BATTERY MODULE WITH ALARM LINE

This application claims priority under 35 U.S.C. § 119 to patent application no. DE 10 2012 214 953.8, filed on Aug. 23, 2012 in Germany, the disclosure of which is incorporated herein by reference in its entirety.

BACKGROUND

The present disclosure relates to a battery module with an alarm line, which battery module has at least one battery cell and is designed to bridge itself in the case of a critical state of the at least one battery cell being present.

It is known for battery modules to be assembled from a plurality of identical storage elements. In this case, in particular, rechargeable electrochemical cells or battery cells are appropriate as storage elements. If the battery modules are intended to have a higher voltage than an individual storage element, then the voltage of the battery module is increased by connecting individual storage elements in series. If the battery module is intended to have a higher total capacity or a higher current-supplying capability than an individual storage element, then a plurality of storage elements are interconnected in parallel with one another. Furthermore, combinations of series and parallel interconnections are customary, in which, for example, three elements interconnected in series with one another are connected in parallel with three further elements interconnected in series with one another (3s2p configuration). Such a battery module has three times the voltage and twice the capacity of an individual storage element.

Furthermore, the prior art discloses monitoring circuits which generate an alarm signal in the case of the presence of a prohibited or critical state of the battery cell of a battery module or of a battery system. If such a critical state of a battery cell is present, said battery cell is usually bridged within the battery module or within the battery system in which it is connected in series or with which it is connected in parallel. In this case, many approaches for bridging individual battery cells in the case of faulty behavior thereof are known from the prior art. However, the prior art hitherto has not disclosed any approaches as to how the bridging of entire battery modules, for example within a battery system as a reaction to the faulty behavior of an arbitrary battery cell within a battery module, can be realized.

SUMMARY

The disclosure provides a battery module for a battery system, comprising two terminals, via which the battery module can be electrically connected to a battery system. Furthermore, the battery module has a battery string, which connects the two terminals to one another and has at least one battery cell connected in series and/or in parallel with the battery string. The battery module comprises a battery module circuit, which is designed, upon receiving an alarm signal, to bridge the battery module via the terminals thereof, wherein the at least one battery cell is connected to a monitoring circuit associated with the battery cell. According to the disclosure, the monitoring circuit is connected to an alarm line via an electrical connection, wherein the alarm line is connected to the input of the battery module circuit.

The provision of such battery modules makes it possible to obtain battery systems having intrinsically safe battery modules which bridge themselves in the case of the presence of a critical state, for example, a faulty battery cell within the battery module, or are able to decouple themselves from the terminals by which they can be connected to a battery system.

In a preferred embodiment, the monitoring circuit is designed to apply an alarm signal to the alarm line if the battery cell connected to the monitoring circuit is in a critical state.

As a result, it is possible to perform the bridging of the entire battery module, for example, within a battery system or the decoupling of the entire battery module from a battery system in a manner dependent on the state of only one individual battery cell independently of the battery module. In this case, the monitoring circuit is also able to identify such a critical state of a battery cell.

In one preferred further development of this embodiment, the battery cell is in a critical state precisely when an overcurrent flows through the battery cell and/or the battery cell has an overvoltage and/or an undervoltage and/or an overtemperature. The bridging of the entire battery module can thus be made dependent on the presence of a specific type of fault in an individual battery cell.

Preferably, the electrical connection between the monitoring circuit and the alarm line has an isolator and a switching means. By virtue of the isolator, the electrical signals of the monitoring circuit or the monitoring circuit itself integrated in or on the battery cell are/is better protected against interfering influences by the internal circuits of the battery module. The switching means enables the battery module circuit to be driven in an optimized manner.

In one preferred further development of this embodiment, the switching means is embodied as a semiconductor component. Particularly preferably, the switching means is embodied as a MOSFET, as an IGBT or as a thyristor.

Preferably, the switching means is embodied as a bipolar transistor in open-collector configuration, wherein the base of the bipolar transistor is electrically connected to the monitoring circuit and the collector of the bipolar transistor is electrically connected to the alarm line. Bipolar transistors have a high dielectric strength and high switching speeds. Furthermore, their conduction losses are linearly proportional to the current flowing through them and to the collector-emitter saturation voltage. The open-collector configuration makes it possible to alter the voltage drop across the emitter-collector path by means of a signal at the base of the bipolar transistor.

In one preferred embodiment, the battery module circuit has a half-bridge circuit, via which the battery module can be bridged via the terminals thereof.

By means of a half-bridge circuit, the battery module, by the driving of the two switching means of the half-bridge circuit, can, in a simple manner, be supplementarily connected to or decoupled from a battery system string with which the battery module can be interconnected for example externally within a battery system. A bridging of the battery module within the battery system string of a battery system is thus possible in a simple manner in which the battery module is bridged via its terminals. If the battery module is connected by its two terminals to a battery system, the two terminals of the battery module can be connected to one another via the half-bridge circuit for the purpose of bridging or decoupling the battery module, while at the same time the battery string within the battery module can be interrupted by the half-bridge circuit.

In one preferred further development of this embodiment, the switching means of the half-bridge circuit are embodied as semiconductor switches. Semiconductor switches can be realized cost-effectively and very compactly, that is to say with high integration density. Furthermore, semiconductor switches, for example in comparison with electromechanical switching means, have a fast switching time and stable amplification and response times.

Preferably, the battery module circuit comprises a logic and driver circuit having an input connected to the alarm line and a first output connected to the control electrode of the first switching means of the half-bridge circuit, and a second output connected to a control electrode of the second switching means of the half-bridge circuit.

A driver switch functions as an interface between a logic signal and a power switch. A logic circuit serves for logically evaluating an input signal present at its input. The alarm signals communicated by the monitoring circuit are processed and amplified by the logic and driver circuit.

Preferably, the battery module circuit has a control unit, via which at least one contactor of a battery system that can be connected to the battery module can be driven and/or which is designed to instigate the bridging of the battery module via the terminals thereof. The additional incorporation of a control unit within the battery module for driving the contactor of a battery system makes it possible overall to increase the safety of a battery system in which the battery module is incorporated. In the case of a fault in a battery cell of the battery module according to the disclosure, the connection, for example between the terminals of a battery system and the battery system strings thereof, can also then be interrupted by the driving of a contactor. The connection between the battery system and a load, for example, can therefore be interrupted by means of the control unit of the battery module. Furthermore, using an incorporated control unit, a bridging of the battery module via the terminals thereof can be performed for example even if the monitoring circuit of an associated battery cell has failed.

In one preferred further development of this embodiment, the control unit is embodied as a microcontroller. Microcontrollers can be adapted very well in terms of power and equipment to the respective application envisaged for them. Furthermore, they are very cost-effective compared with other computing systems.

Furthermore, a battery comprising a battery module according to the disclosure is provided, wherein the battery is particularly preferably embodied as a lithium-ion battery. Advantages of such batteries are afforded, inter alia, in their comparatively high energy density and their high thermal stability. A further advantage of lithium-ion batteries is that they are not subject to a memory effect.

Furthermore, a motor vehicle comprising a battery comprising a battery system according to the disclosure is provided, wherein the battery is connected to a drive system of the motor vehicle.

Advantageous developments of the disclosure are specified in the dependent claims and described in the description.

BRIEF DESCRIPTION OF THE DRAWINGS

Exemplary embodiments of the disclosure are explained in greater detail with reference to the drawings and the following description. In the figures.

DETAILED DESCRIPTION

Figure 1:
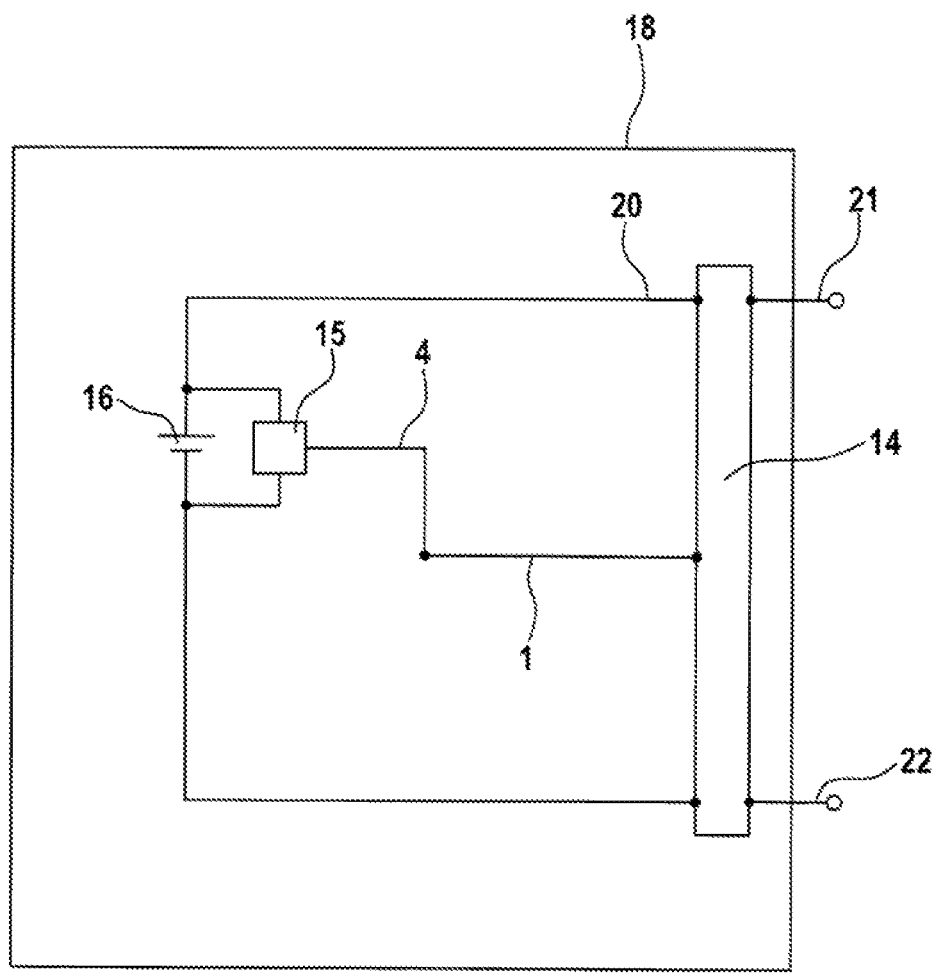
FIG. 1 shows an embodiment of a battery module according to the disclosure.

FIG. 1 illustrates an embodiment of a battery module 18 according to the disclosure, which battery module has two terminals 21, 22, which are electrically conductively connected to one another via a battery string 20. In this exemplary embodiment, for illustrative purposes, the battery string 20 has only one battery cell 16 being connected in series with the battery string 20. However, it is also possible to realize battery modules 18 according to the disclosure having a large multiplicity of battery cells 16 connected in series and alternatively or supplementarily in parallel with the battery string 20 of the battery module 18. The battery cell 16 of the battery module 18 is connected to a monitoring circuit 15 associated with the battery cell 16. Said monitoring circuit 15 can be integrated in or on the battery cell 16, for example. In this case, in the exemplary embodiment of FIG. 1, a first input of the monitoring circuit 15 is directly connected to the anode of the battery cell 16 and a second input of the monitoring circuit 15 is directly connected to the cathode of the battery cell 16. The output of the monitoring circuit 15 is connected to an alarm line 1 via an electrical connection 4.

Furthermore, in this exemplary embodiment, the monitoring circuit 15 is designed to apply an alarm signal to the alarm line 1 if the battery cell 16 connected to the monitoring circuit 15 is in a critical state. Therefore, if the monitoring circuit 15 detects a critical state, which is present in this exemplary embodiment purely by way of example when an overcurrent flows through the battery cell 16 and/or the battery cell 16 has an overvoltage and/or an undervoltage and/or an overtemperature, then the monitoring circuit 15 applies an alarm signal to the alarm line 1. In this case, a critical state can also exist in the presence of some other situation, such as, for example, the presence of an excess pressure in the battery cell 16. The battery module 18 furthermore has a battery module circuit 14, which is designed, upon receiving an alarm signal, to bridge the battery module 18 via the terminals 21, 22 thereof. The battery module circuit 14 is connected to the two terminals 21, 22 of the battery module 18 and is designed to directly connect the two terminals 21, 22 to one another and at the same time to interrupt the battery string 20 between a terminal 21, 22 and the battery cell 16. Via the electrical connection 4 and the alarm line 1, the output of the monitoring circuit 15 connected to the battery cell 16 and associated therewith is connected to the input of the battery module circuit 14.

If the monitoring circuit 15 detects purely by way of example an overcurrent flowing through the battery cell 16, then it applies an alarm signal to the alarm line 1, said alarm signal being communicated via the alarm line 1 to the input of the battery module circuit 14. The battery module circuit 14 thereupon bridges the entire battery module 18 via the terminals 21, 22 thereof and interrupts the battery string 20 between one of the terminals 21, 22 and the battery cell 16. Therefore, if the battery module 18 is connected to a battery system or a battery system string, the battery module circuit 14 of the battery module 18 according to the disclosure can bridge the same within the battery system string or decouple the same from the battery system string.

Figure 2:
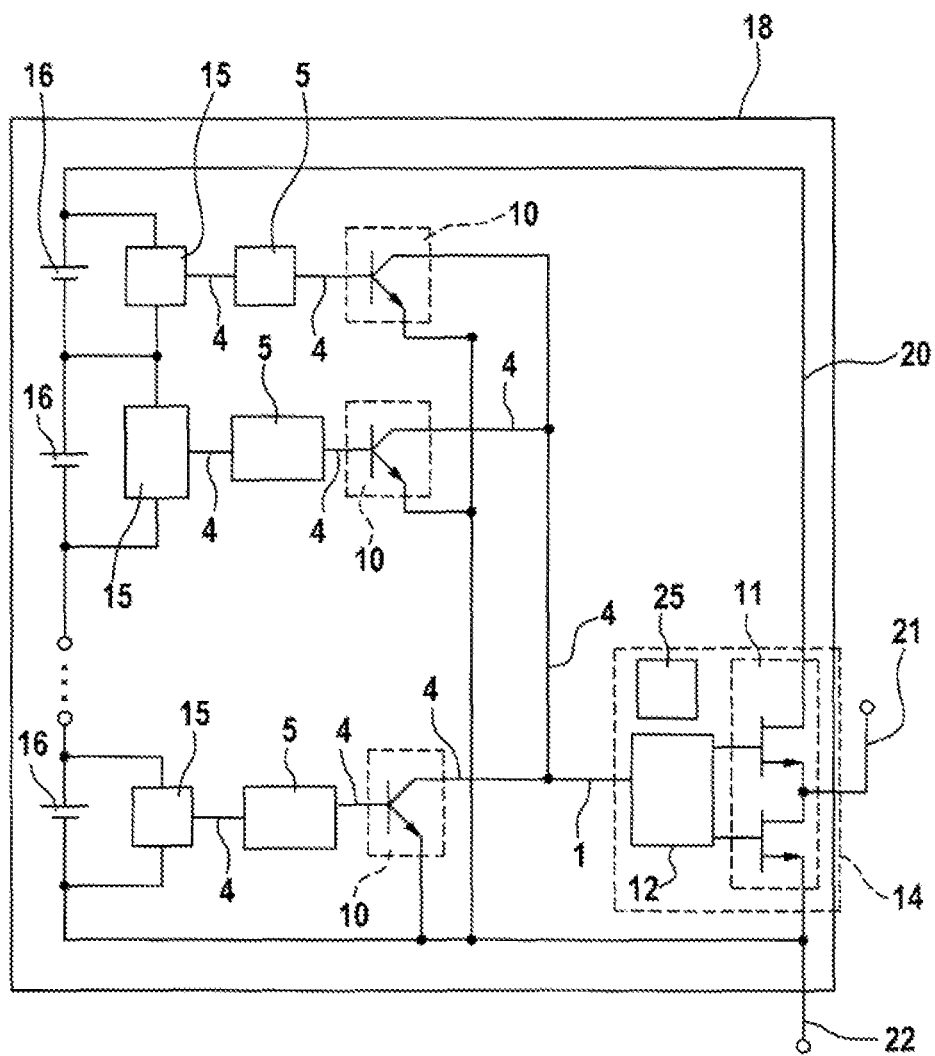
FIG. 2 shows an embodiment of a battery module according to the disclosure with a half-bridge circuit.

FIG. 2 shows an embodiment of a battery module 18 according to the disclosure with a half-bridge circuit 11. In this case, the basic construction of the embodiment illustrated in FIG. 2 is similar to that of the embodiment of the battery module 18 according to the disclosure as illustrated in FIG. 1. As in FIG. 1, the battery module 18 has two terminals 21, 22, which are connected to one another via a battery string 20. In this exemplary embodiment, the battery string 20 has a number—not defined any further—of series-connected battery cells 16, of which three are illustrated in a configured fashion in FIG. 2, while the remaining battery cells 16 are merely indicated by a dotted line. There is connected to each battery cell 16 of the battery string 20 a monitoring circuit 15 associated with the battery cell 16, as explained in the description concerning FIG. 1. In the exemplary embodiment illustrated in FIG. 2, the monitoring circuits 15 of the battery cells 16 are likewise interconnected. In this regard, in this exemplary embodiment, in each case an input of a first monitoring circuit 15 and an input of a second monitoring circuit 15, adjacent to the first, are connected to the same potential point, to one another between the two respectively associated series-connected battery cells 16, and to the battery string 20. To put it another way, a first input of a first monitoring circuit 15 together with a second input of a second monitoring circuit 15, adjacent to the first monitoring circuit 15, are connected to the battery string 20 at the same potential of the battery string 20 between the two associated battery cells 16. The type of monitoring circuit 15 and also the type of the respective connection thereof to a respective battery cell 16 and the interconnection thereof are chosen merely by way of example in this exemplary embodiment. It is also possible to realize monitoring circuits 15 which, for example, are connected only to one electrode of a battery cell 16 or are linked thereto and configured quite differently.

In this exemplary embodiment, the electrical connections 4 between the monitoring circuits 15 and the alarm line 1 have in each case an isolator 5 and in each case a switching means 10. To put it another way, an electrical connection 4 between a monitoring circuit 15 and the alarm line 1 leads in each case via an isolator 5 connected in series with the electrical connection 4. In this exemplary embodiment, the electrical connections 4 connect the outputs of the monitoring circuits 15 via the respective isolator 5 to a respective control electrode of a switching means 10 embodied as a bipolar transistor. In this exemplary embodiment, the respective bipolar transistor here is embodied in an open-collector configuration, wherein, as already mentioned, the control electrode or the base electrode, that is to say the base of the bipolar transistor, is electrically connected to the associated monitoring circuit 15 and the collector of the respective bipolar transistor is electrically connected to the alarm line 1. In this exemplary embodiment, the emitters of the bipolar transistors are all connected to the same potential within the battery module 18, to the potential of the terminal 22 in this exemplary embodiment. In this exemplary embodiment, the electrical connection 4 between the output of a monitoring circuit 15 and the alarm line 1 therefore leads in each case via the collector of a bipolar transistor. The incorporation of both the isolators 5 and the switching means 10 is purely optional in this exemplary embodiment. The embodiment of the switching means 10 is also chosen purely by way of example in this exemplary embodiment. It is also possible to realize battery modules 18 according to the disclosure without these components, or with switching means 10 embodied differently, for example using semiconductor switches.

As explained in the description regarding FIG. 1, the alarm line 1 is connected to the input of the battery module circuit 14. In this exemplary embodiment, the battery module circuit 14 has a half-bridge circuit 11, via which the battery module 18 can be bridged or decoupled via the terminals 21, 22 thereof. For this purpose the half-bridge circuit 11 has a first and a second switching means, which are embodied as semiconductor switches in this exemplary embodiment. In this case, the second switching means of the half-bridge circuit 11 is arranged directly between the two terminals 21, 22 of the battery module 18 and the first switching means of the half-bridge circuit 11 is arranged between a terminal 21, 22 and the battery cells 16. If the first switching means of the half-bridge circuit 11 is closed and the second switching means of the half-bridge circuit 11 is open, the battery module 18 according to the disclosure is not bridged. The terminals 21, 22 are then connected to one another via the battery string 20. By contrast, if the first switching means of the half-bridge circuit 11 is open and the second switching means of the half-bridge circuit 11 is closed, the two terminals 21, 22 of the battery module 18 according to the disclosure are directly connected to one another, while the battery string 20 is interrupted via the open first switching means of the half-bridge circuit 11.

Furthermore, the battery module circuit 14 has a logic and driver circuit 12 having an input connected to the alarm line 1, and a first output connected to a control electrode of the first switching means of the half-bridge circuit 11, and a second output connected to a control electrode of the second switching means of the half-bridge circuit 11. In other words, in this exemplary embodiment, therefore, the control electrodes of the two switching means—embodied as semiconductor switches—of the half-bridge circuit 11 are connected to the outputs of the logic and driver circuit 12. In this exemplary embodiment, the logic and driver circuit 12 serves firstly for logically evaluating an alarm signal present at its input, and secondly for communicating control signals to the control electrodes of the switching means of the half-bridge circuit 11. In this case, the control signals generated by the logic and driver circuit 12 correspond to the result of the logical evaluation. In this exemplary embodiment, the logic circuit for evaluating an alarm signal and the driver circuit for the two switching means of the half-bridge circuit 11 are integrated in one circuit. However, it is also possible to realize battery modules 18 according to the disclosure in which these two components are separate from one another. By way of example, alarm signals can also firstly be evaluated in a logic circuit connected upstream and the result of this evaluation can then be communicated to a driver circuit for operating the switching means of the half-bridge circuit 11.

Furthermore, the battery module circuit 14 has a control unit 25, by means of which at least one contactor of a battery system that can be connected to the battery module 18 according to the disclosure can be driven and/or which is designed to instigate the bridging of the battery module 18 via the terminals 21, 22 thereof. To put it another way, this control unit 25 makes it possible, when the battery module 18 according to the disclosure is used in a battery system, for example via an additional connection of the battery module 18 to a bus system of the battery system, to drive a contactor of the battery system. Such a contactor can be, for example, a contactor which is incorporated in a charging and/or disconnecting device of a battery system and via which the battery system can be disconnected from at least one of its terminals or a load connected to the battery system. Furthermore, said control unit 25 is designed to instigate a bridging of the battery module 18 via the terminals 21, 22 thereof, without an alarm signal generated by a monitoring circuit 15 having to be present for this purpose.

If an arbitrary monitoring circuit 15 ascertains or measures for example an overvoltage of the associated battery cell 16 within the battery string 20, then this monitoring circuit 15, via the electrical connection 4, drives the control electrode of the associated switching means 10 embodied as a bipolar transistor. The voltage drop across the collector-emitter path of the bipolar transistor associated with the monitoring circuit 15 thereupon changes. This change in the voltage drop leads to an alarm signal being applied to the alarm line 1. The alarm signal is communicated, via the alarm line 1, to the input of the logic and driver circuit 12. The alarm signal is processed in said logic and driver circuit 12. Driver or control signals for the switching means of the half-bridge circuit 11 are thereupon generated and communicated to the control electrodes of the switching means of the half-bridge circuit 11. By means of the half-bridge circuit 11, a bridging of the battery module 18 according to the disclosure via the terminals 21, 22 thereof is then performed. The battery module 18 is thus protected against damage by the battery cell 16 having overvoltage, since the latter is no longer connected to the supply voltage.

What is claimed is:

1. A battery module for a battery system, comprising:
   two terminals configured to be electrically connected to the battery system;
   a battery string configured to connect the two terminals to one another, the battery string including a plurality of battery cells connected in series and/or in parallel with the battery string;
   a plurality of battery monitoring circuits, each battery monitoring circuit being connected to one battery cell in the plurality of battery cells via an electrical connection, wherein at least one battery monitoring circuit in the plurality of battery monitoring circuits is configured to apply an alarm signal to an alarm line in response to detecting that the one battery cell in the plurality of battery cells is in a critical state; and
   a battery module circuit connected to each battery monitoring circuit in the plurality of battery monitoring circuits via the alarm line that is connected to one input of the battery module circuit and to each battery monitoring circuit in the plurality of battery monitoring circuits, the battery module circuit being configured to bridge the battery module via the two terminals upon receiving the alarm signal to disconnect the plurality of battery cells from any load in response to receiving the alarm signal from any battery monitoring circuit in the plurality of battery monitoring circuits.

2. The battery module according to claim 1, wherein at least one battery monitoring circuit in the plurality of battery monitoring circuits detects that at least one battery cell in the plurality of battery cells is in the critical state in response to detection that:
   (i) an overcurrent flows through the at least one battery cell,
   (ii) the at least one battery cell has an overvoltage,
   (iii) the at least one battery cell has an undervoltage, or
   (iv) the at least one battery cell has an overtemperature.

3. The battery module according to claim 1, wherein the electrical connection includes an isolator and a switching device.

4. The battery module according to claim 3, wherein the switching device includes a semiconductor element.

5. The battery module according claim 1, wherein the battery module circuit includes a half-bridge circuit, via which the battery module is configured to be bridged via the terminals.

6. The battery module according to claim 5, wherein a switching device of the half-bridge circuit includes at least one semiconductor switch.

7. The battery module according to claim 6, wherein the battery module circuit includes a logic and driver circuit having an input connected to the alarm line and a first output connected to a control electrode of a first switching device of the half-bridge circuit, and a second output connected to a control electrode of a second switching device of the half-bridge circuit.

8. The battery module according to claim 1, wherein the battery module circuit includes a control unit, via which at least one contactor of the battery system that can be connected to the battery module can be driven and/or which is configured to instigate the bridging of the battery module via the terminals.

9. The battery module according to claim 8, wherein the control unit includes a microcontroller.

10. A battery comprising:
    a battery module including
    two terminals configured to be electrically connected to a battery system,
    a battery string configured to connect the two terminals to one another, the battery string including a plurality of battery cells connected in series and/or in parallel with the battery string,
    a plurality of battery monitoring circuits, each battery monitoring circuit being connected to one battery cell in the plurality of battery cells via an electrical connection, wherein at least one battery monitoring circuit in the plurality of battery monitoring circuits is configured to apply an alarm signal to an alarm line in response to detecting that the one battery cell in the plurality of battery cells is in a critical state, and
    a battery module circuit connected to each battery monitoring circuit in the plurality of battery monitoring circuits via the alarm line that is connected to one input of the battery module circuit and to each battery monitoring circuit in the plurality of battery monitoring circuits, the battery module circuit being configured to bridge the battery module via the two terminals upon receiving the alarm signal to disconnect the plurality of battery cells from any load in response to receiving the alarm signal from any battery monitoring circuit in the plurality of battery monitoring circuits.

11. A motor vehicle comprising:
    a drive system; and
    a battery module connected to the drive system, the battery module including:
    two terminals configured to be electrically connected to a battery system,
    a battery string configured to connect the two terminals to one another, the battery string including a plurality of battery cells connected in series and/or in parallel with the battery string,
    a plurality of battery monitoring circuits, each battery monitoring circuit being connected to one battery cell in the plurality of battery cells via an electrical connection, wherein at least one battery monitoring circuit in the plurality of battery monitoring circuits is configured to apply an alarm signal to an alarm line in response to detecting that the one battery cell in the plurality of battery cells is in a critical state, and
    a battery module circuit connected to each battery monitoring circuit in the plurality of battery monitoring circuits via the alarm line that is connected to one input of the battery module circuit and to each battery monitoring circuit in the plurality of battery monitoring circuits, the battery module circuit being configured to bridge the battery module via the two terminals upon receiving the alarm signal to disconnect the plurality of battery cells from the drive system in response to receiving the alarm signal from any battery monitoring circuit in the plurality of battery monitoring circuits.

\* \* \* \* \*